(12) United States Patent
Johnson et al.

(10) Patent No.: US 9,026,299 B2
(45) Date of Patent: May 5, 2015

(54) NAVIGATION SYSTEM AND METHOD FOR AUTONOMOUS MOWER

(75) Inventors: David August Johnson, Cary, NC (US); Colin Eric Das, Mt. Prospect, IL (US)

(73) Assignee: Deere & Company, Moline, IL (US)

( * ) Notice: Subject to any disclaimer, the term of this patent is extended or adjusted under 35 U.S.C. 154(b) by 337 days.

(21) Appl. No.: 13/544,277

(22) Filed: Jul. 9, 2012

(65) Prior Publication Data

US 2014/0012453 A1 Jan. 9, 2014

(51) Int. Cl.
*G05D 1/02* (2006.01)

(52) U.S. Cl.
CPC .................................... *G05D 1/0219* (2013.01)

(58) Field of Classification Search
USPC ............................. 701/23; 700/245; 356/138
See application file for complete search history.

(56) References Cited

U.S. PATENT DOCUMENTS

| | | | |
|---|---|---|---|
| 3,009,525 A | 11/1961 | De Liban | |
| 3,550,714 A | 12/1970 | Bellinger | |
| 4,919,224 A | 4/1990 | Shyu et al. | |
| 6,321,515 B1 | 11/2001 | Colens | |
| 6,339,735 B1 * | 1/2002 | Peless et al. | 701/23 |
| 8,583,285 B2 * | 11/2013 | Aurnhammer et al. | 700/255 |
| 8,706,297 B2 * | 4/2014 | Letsky | 700/245 |
| 8,874,269 B2 * | 10/2014 | Biber et al. | 700/259 |
| 2002/0140393 A1 * | 10/2002 | Peless et al. | 318/580 |
| 2003/0120389 A1 * | 6/2003 | Abramson et al. | 700/245 |
| 2005/0007057 A1 * | 1/2005 | Peless et al. | 318/580 |
| 2005/0113990 A1 * | 5/2005 | Peless et al. | 701/23 |
| 2006/0079997 A1 * | 4/2006 | McLurkin et al. | 700/245 |
| 2008/0167753 A1 * | 7/2008 | Peless et al. | 700/253 |
| 2008/0183349 A1 * | 7/2008 | Abramson et al. | 701/23 |
| 2009/0319081 A1 * | 12/2009 | Kock et al. | 700/245 |
| 2011/0166701 A1 | 7/2011 | Thacher | |
| 2011/0190931 A1 | 8/2011 | Anderson et al. | |

(Continued)

FOREIGN PATENT DOCUMENTS

| | | |
|---|---|---|
| DE | 19503148 A1 * | 8/1995 |
| DE | 102007007992 A1 | 8/2008 |

(Continued)

OTHER PUBLICATIONS

Li Zu, Huakun Wang, Feng Yue, "Localization for robot mowers covering unmarked operational area," vol. 3, Publication Year: 2004, pp. 2197-2202 vol. 3.*

(Continued)

*Primary Examiner* — Tuan C. To
(74) *Attorney, Agent, or Firm* — Brinks Gilson & Lione

(57) ABSTRACT

A navigation system for a robotic mower includes a boundary wire defining a boundary of a specified area; a boundary sensor assembly, and a vehicle control unit with a navigation arbitration logic configured to arbitrate a selection between at least a straight propagation mode and an arc propagation mode. The navigation arbitration module is configured to select the arc propagation mode when the sensor assembly indicates that the mower approaches the boundary of the specified area and has a distance from the boundary that is equal to or smaller than a specified turn distance. The boundary sensor assembly generates a sensor signal representative of a measured yaw angle of the mower relative to the boundary wire, and the navigation arbitration logic is configured to generate output information representative of a desired yaw angle dependent on an assumed actual yaw angle.

39 Claims, 12 Drawing Sheets

(56) References Cited

U.S. PATENT DOCUMENTS

| | | | |
|---|---|---|---|
| 2011/0202175 A1* | 8/2011 | Romanov et al. ............ 700/250 |
| 2012/0023880 A1 | 2/2012 | Messina et al. |
| 2012/0023887 A1 | 2/2012 | Messina et al. |
| 2012/0029752 A1 | 2/2012 | Johnson et al. |
| 2012/0029753 A1 | 2/2012 | Johnson et al. |
| 2012/0029754 A1 | 2/2012 | Thompson et al. |
| 2012/0029755 A1 | 2/2012 | Johnson |
| 2012/0029756 A1 | 2/2012 | Johnson et al. |
| 2012/0101679 A1 | 4/2012 | Anderson et al. |
| 2012/0166019 A1 | 6/2012 | Anderson et al. |
| 2012/0197495 A1* | 8/2012 | Senneff et al. ................. 701/42 |

FOREIGN PATENT DOCUMENTS

| | | |
|---|---|---|
| EP | 1 025 472 | 8/2000 |
| EP | 1 058 958 | 12/2000 |
| EP | 1 302 147 | 4/2003 |
| EP | 1 512 053 | 3/2005 |
| JP | 2007018451 A * | 1/2007 |
| JP | 2012185134 A * | 9/2012 |
| WO | WO 2010/077198 | 7/2010 |
| WO | WO 2011/115534 | 9/2011 |
| WO | WO 2011/115535 | 9/2011 |
| WO | WO 2011/115563 | 9/2011 |
| WO | WO 2011/129728 | 10/2011 |
| WO | WO 2012/005642 | 1/2012 |
| WO | WO 2012/044220 | 4/2012 |

OTHER PUBLICATIONS

Smith, A.D., Chang, H.J., Blanchard, E.J., "An outdoor high-accuracy local positioning system for an autonomous robotic golf greens mower," Publication Year: 2012, pp. 2633-2639.*
European Search Report dated Oct. 28, 2013 (7 pages).

* cited by examiner

NAVIGATION SYSTEM AND METHOD FOR AUTONOMOUS MOWER

BACKGROUND

1. Field of the Invention

This invention relates to navigation systems for robotic lawn mowers and, more specifically, to vehicle control units for robotic lawn mowers implementing a navigation logic and to control methods for robotic lawn mowers with vehicle control units utilizing such a navigation logic.

2. Description of Related Technology

Robotic mowers may include boundary sensing systems with sensor assemblies to enable the mower to detect a boundary wire signal marking the boundary of an area to be mowed. Boundary sensing systems may detect when the robotic mower has reached the boundary wire. When the robotic mower reaches the boundary wire, a vehicle control unit may, for example, prompt the drive system of the mower to stop and to make a turn. A reliable navigation logic that is able to adapt the lawn mower path dependent on the yaw angle of the robotic lawn mower and for the distance of the robotic lawn mower from the boundary wire when approaching the boundary wire at an oblique angle, is desirable.

SUMMARY OF THE INVENTION

In order to address this need a boundary sensor assembly for detecting a vehicle control unit for a robotic mower, a navigation system and a method for navigating a robotic mower are disclosed herein. The vehicle control unit comprises a navigation arbitration logic configured to arbitrate a selection between at least a first propagation mode and a second propagation mode, the first propagation mode being a mode of straight propagation of the mower and the second propagation mode being a mode of arc-shaped propagation of the mower, the navigation arbitration module being configured to select the second propagation mode when receiving sensor information indicating that the mower approaches a boundary of a specified area and has a distance from the boundary that is equal to or smaller than a specified turn distance.

In another aspect of the invention, the vehicle control unit is configured to receive sensor information representative of a measured yaw angle of the mower relative to the boundary.

In a further aspect of the invention, the navigation arbitration logic is configured to generate output information representative of a desired yaw angle, the desired yaw angle being dependent on an assumed actual yaw angle being one of an estimated yaw angle and the measured yaw angle.

In yet another aspect of the invention, in the first propagation mode, the desired yaw angle relative to the boundary wire is equal to the measured yaw angle.

In still a further aspect of the invention, in the second propagation mode, the desired yaw angle represents a mirror reflection of the measured yaw angle on a vertical plane extending along the boundary wire.

In another aspect of the invention, the vehicle control unit comprises an actuator module configured to convert the desired yaw angle into a yaw angle difference between the desired yaw angle and the assumed actual yaw angle.

In a further aspect of the invention, the vehicle control unit is configured to receive sensor information representative of a measured distance of the mower relative from the boundary and wherein the navigation arbitration logic is configured to generate output information representative of a desired speed vector in the second propagation mode, the desired speed vector being dependent on the measured distance.

In yet another aspect of the invention, a speed component of the desired speed vector perpendicular to the boundary is positively correlated to the measured distance from the boundary.

In still a further aspect of the invention, the magnitude of the desired speed vector is positively correlated to the measured distance from the boundary.

In an additional aspect of the invention, the vehicle control unit is configured to generate input quantities for a mower propulsion system to cause a desired behavior based on the selection of the first propagation mode or the second propagation mode.

In another aspect of the invention, the control unit is configured to generate input quantities for a mower blade motor system to cause a desired rotational blade speed based on the selection of the first propagation mode or the second propagation mode.

In a further aspect of the invention, the navigation arbitration logic is configured to generate output information representative of a desired speed vector, the desired speed vector having a greater magnitude in the first propagation mode than in the second propagation mode.

In an additional aspect of the invention, the vehicle control unit comprises a positioning module configured to calculate an absolute current position of the mower within the specified area.

In an additional aspect of the invention, a method for navigating the lawn mower is provided that comprises the steps performed by the vehicle control unit.

In yet another aspect of the invention, a navigation system is provided with the vehicle control unit, a boundary wire defining a boundary of a specified area, and a boundary sensor assembly providing sensor input information processed by the vehicle control unit.

DESCRIPTION OF PREFERRED EMBODIMENTS

Figure 1:
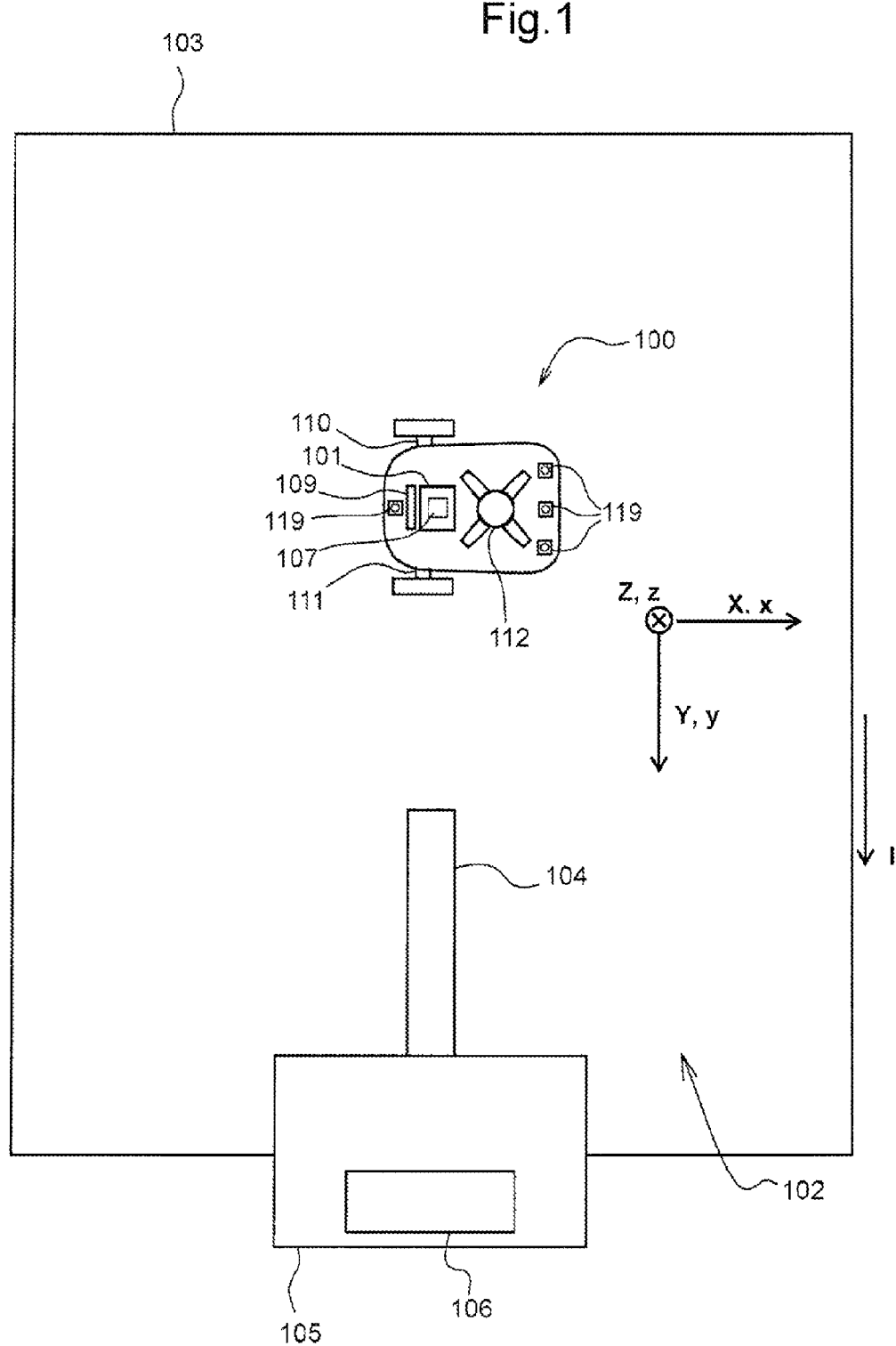
FIG. 1 is schematic drawing of a robotic lawn mower system, including a robotic lawn mower within a main boundary wire according to a preferred embodiment of the invention.

In a preferred embodiment of the invention, as shown in FIG. 1, a robotic mower 100 is powered by battery pack 109 that is periodically charged at charging station 105. A vehicle control unit 101 controls all of the electronic functions of the robotic mower. For example, vehicle control unit 101 may command one or more traction motors 110 and 111 to drive fraction wheels, blade motor 112 to rotate a cutting blade or blades, battery pack 109, a user interface module 107 and various sensors.

Vehicle control unit (VCU) 101 may be a printed circuit board assembly that serves as the main control board for the robotic mower 100. The vehicle control unit 101 may interpret and process information from the various sensors and use that information to control and operate the pair of traction motors 110 and 111 to drive the robotic mower 100 over a yard in order to maintain the lawn, and to drive the blade motor 112. The sensors themselves include one or more boundary sensor assemblies 119, and may also include one or more obstacle sensors or accelerometers. The vehicle control unit 101 may communicate with the battery pack in order to monitor the status of the battery pack 109 and maintain a charge in the one or more batteries (such as lithium ion batteries) of the battery pack 109. The vehicle control unit 101 also may be connected to the user interface module 107 that may include an LCD display along with several indicator lights and key buttons for operator input. The vehicle control unit 101 may include a microcontroller and an external static random access memory (SRAM) connected to the microcontroller with a data bus.

The vehicle control unit 101 may interface and control a blade motor controller, which controls the blade motor 112 that drives the cutting blades of the robotic mower 100. The vehicle control unit 101 may have inputs for receiving signals from Hall Effect rotor position sensors to sense the speed of the blade motor 112 using feedback from the Hall Effect sensors, and may sense the current through the phases of the blade motor 112.

To move the robotic mower 100, the vehicle control unit 101 is preferably connected to a traction motor controller for the left and right traction motors 110 and 111. The vehicle control unit 101 may have inputs for receiving signals from Hall Effect rotor position sensors contained in the traction motors 110 and 111 and, in this way, the vehicle control unit 101 can sense the speed of each traction motor 110 and 111 using feedback from the Hall effect sensor and can sense the current through the phases of the fraction motors.

Still referring to FIG. 1, the robotic mower 100 operates in a specified area 102 that is surrounded by a main or outer boundary wire 103 that forms a loop positioned at or below the ground or turf surface. Additionally, inner wire 104 may be a shorter loop provided within the area of the main boundary wire where a charging station 105 is positioned. The main boundary wire 103 and inner wire 104 may be connected to charging station 105.

In one embodiment, a boundary drive circuit 106 may be contained in charging station 105, and may drive signals through the main boundary wire 103 and the inner wire 104. The fundamental frequency of the waveform on the main boundary wire is preferably about 2 kHz and the robotic mower 100 has at least one boundary wire sensor assembly 119 that detects the waveform and provides a signal to the vehicle control unit 101 to indicate the distance of the sensor assembly 119 to the main boundary wire 103.

FIG. 1 further illustrates the chosen nomenclature for describing stationary and non-stationary Cartesian coordinates. In the description of the subsequent drawings, the designations X, Y, and Z in capital letters refer to stationary Cartesian coordinates based on the portion of the stationary boundary wire 103 that is then being approached by the robotic mower 100. Z designates a vertical axis, indicated by a circle with an x in the center that indicates an orientation pointing into the image plane, thus generally in the direction of gravity in the top down illustration of FIG. 1. Y designates a horizontal direction along the boundary wire 103. If a DC current flows through the boundary wire 103, Y corresponds to the direction of the electric current I. An AC current reverses its direction in a sinusoidal oscillation and thus periodically changes its orientation relative to the Y coordinate. X designates a horizontal axis that perpendicular to the boundary wire 103 and generally points out of the specified area 102 to be mowed if the Y coordinate is oriented clockwise around the specified area 102. Conversely, the horizontal axis of X points into of the specified area 102 if the Y coordinate is oriented counterclockwise, in accordance with the right-hand rule for positive Cartesian coordinate systems.

In a similar manner, lowercase designations x, y, and z are chosen for coordinates relative to a given boundary sensor assembly 119. The coordinates x, y, and z point in the same directions as the coordinates X, Y, and Z when the robotic lawn mower 100 approaches the boundary wire 103 at a right angle on a horizontal surface. Coordinate x points in a direction of forward movement of the robotic mower 100 and defines the longitudinal axis of the robotic mower 100. The coordinates x, y, and z point in different directions than the coordinates X, Y, and Z when the robotic mower 100 is on a slope or positioned relative to the boundary wire 103 at an angle where the longitudinal axis x of the robotic mower 100 is not perpendicular to the boundary wire 103. Any angles that are measured from the stationary coordinates X, Y, and Z are designated by capital Greek letters, such as $\Theta$, and any angles measured from the sensor assembly coordinates x, y, and z are designated by lowercase Greek letters, such as $\psi$, and $\theta$. The coordinates x, y, and z as well as X, Y, and Z have been selected for illustrating the physical geometry of the various embodiments and are not intended to be interpreted in a limiting manner. Additionally, the following geometrical considerations illustrate a boundary wire carrying a DC current I, but are applicable to a boundary wire carrying an AC current when the oscillating phase of the current is taken into account.

Figure 2:
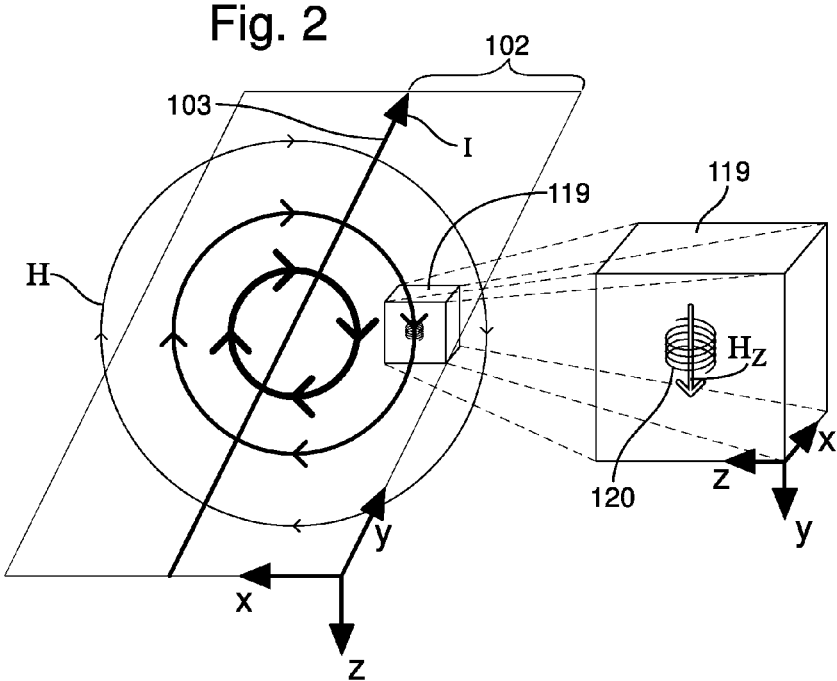
FIG. 2 is a schematic illustration of a boundary sensing system with a boundary sensor assembly for a robotic mower according to one aspect of the invention.

As depicted in FIG. 2, a boundary wire 103 carries an electric DC current I generally in a direction from the bottom of the drawing toward the top of the drawing. The electric current I generates a rotating magnetic field H that generally rotates in a clockwise direction around the boundary wire 103. The boundary sensor assembly 119 includes at least one pickup coil 120 that is oriented so as to be particularly sensitive to a vertical component $H_z$ of the magnetic field H. The boundary sensor assembly 119 includes more than one pickup coil (which is further discussed below), but only the pickup coil 120 is depicted in FIG. 2 for simplicity. As the boundary sensor assembly 119 approaches the boundary wire 103 from within the specified area 102, the pickup coil 120 detects an increasing strength of the vertical component $H_z$ of the magnetic field H. The amplitude of the field strength is an indicator of the horizontal distance of the pickup coil 120 from the boundary wire 103.

Figure 3:
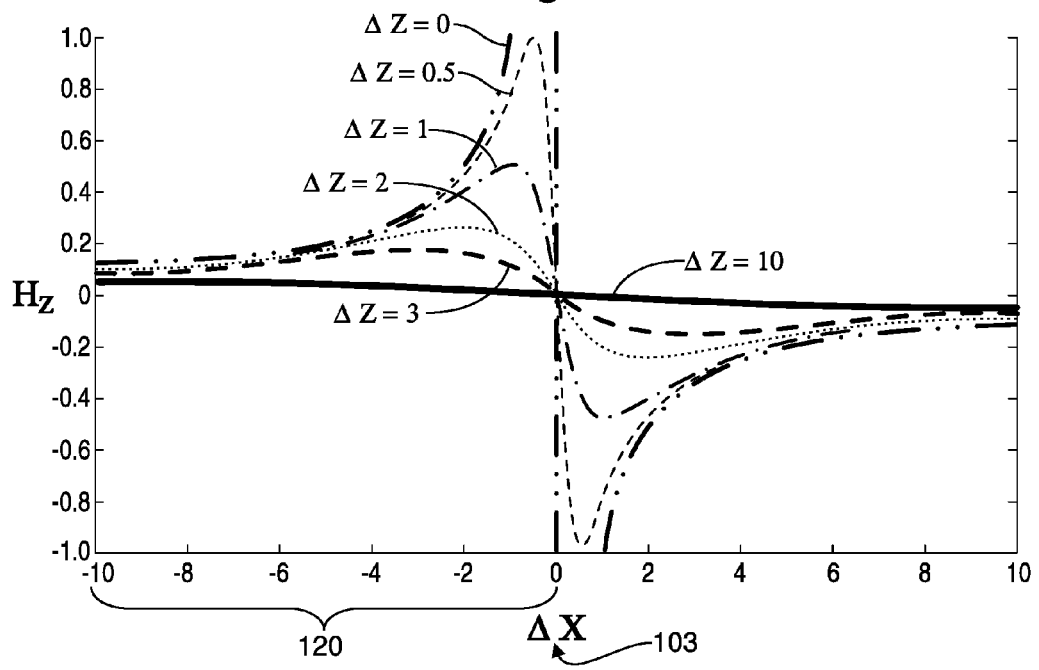
FIG. 3 is a diagram depicting graphs representing pickup coil signals of a boundary sensing system according to FIG. 1.

However, the amplitude of the vertical component $H_z$ of the magnetic field H depends not only on the horizontal distance from the boundary wire 103, but also on the vertical height difference between the pickup coil 120 and the boundary wire 103. The vertical axis of the diagram of FIG. 3 represents the vertical component $H_z$ of the magnetic field strength picked up by the pickup coil 120, and the horizontal axis represents the horizontal distance between the pickup coil 120 and the boundary wire 103. Both axes are shown in relative rather than absolute units. Absolute measurement values depend on the magnitude of the current I and the sensitivity of the pickup coil 120.

In the diagram of FIG. 3, the various plotted graphs are representative of different vertical height differences $\Delta Z$ between the pickup coil 120 and the boundary wire 103. Common in all of the graphs is that the sign of the field strength component $H_z$ changes when the pickup coil 120 crosses over the boundary wire 103. The change in the sign of the field strength component $H_z$ at the boundary wire 103 therefore provides excellent boundary crossing information. In the chosen coordinate system, the magnetic field strength component $H_z$ is positive inside the specified area 102 and negative outside the specified area 102. This reversal of the sign of the magnetic field strength component $H_z$ can be used as a digital input indicating that the boundary wire 103 has been crossed by the sensor assembly 119.

Still referring to FIG. 3, the absolute amplitude of the magnetic field strength component $H_z$ increases steadily as the pickup coil 120 approaches the boundary wire, until the magnetic field strength component $H_z$ decreases rapidly to change its sign. This is most pronounced when the pickup coil 120 is at the same relative height as the boundary wire 103. The absolute amplitude of the magnetic field strength component $H_z$, however, decreases significantly with increasing height differences $\Delta Z$ between the pickup coil 120 and the boundary wire 103. With increasing height of the pickup coil 120, the amplitude of the vertical field strength component $H_z$ approaches zero and does not reliably indicate the change of the sign when crossing the boundary wire 103, as is particularly illustrated in the graph representing the height $\Delta Z$=10.

Figure 4:
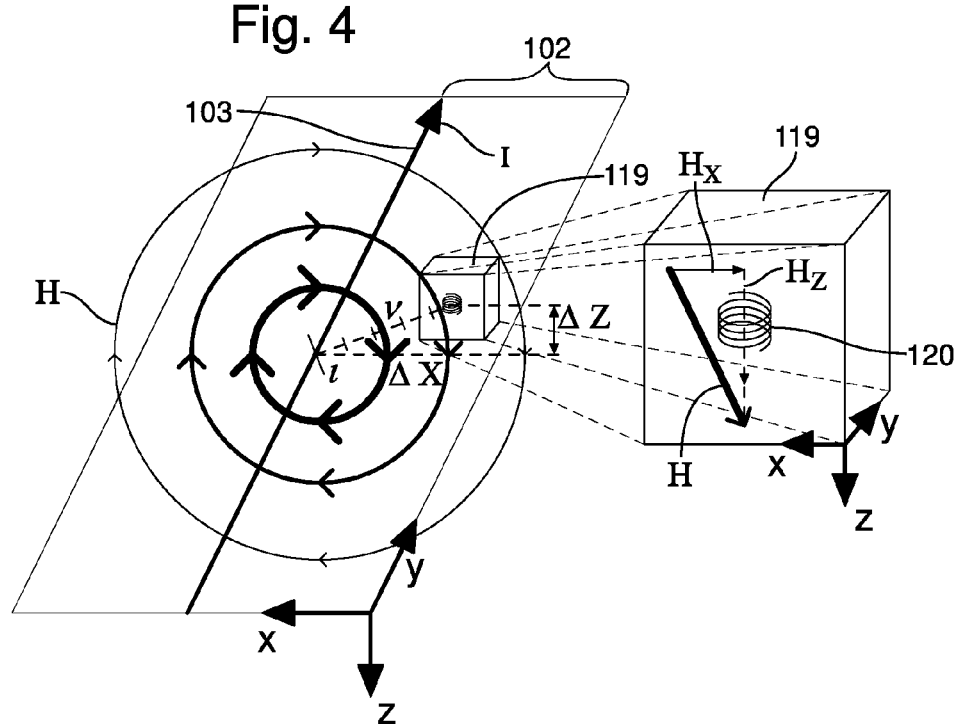
FIG. 4 is a schematic illustration of the boundary sensing system of FIG. 2 with the boundary sensor assembly at a different height relative to the boundary wire.

FIG. 4 illustrates this phenomenon in greater detail. The boundary sensor assembly 119 is elevated by $\Delta Z$ above the boundary wire 103 and has a horizontal distance $\Delta X$ from the boundary wire 103. The magnetic field H in the location of the boundary sensor assembly 119 is not purely vertical as it was in FIG. 2, but has a horizontal component H. Therefore, the vertical component $H_z$ is smaller than if the boundary sensor assembly had the same horizontal distance $\Delta X$ from the boundary wire 103, but a vertical distance $\Delta Z$ equal to zero. At greater height distances $\Delta Z$, the boundary sensor assembly 119 may only get close enough to the boundary wire 103 for a detectable field strength H at a very close horizontal distance $\Delta X$, where the vertical component $H_z$ itself is barely or not detectable.

Figure 5:
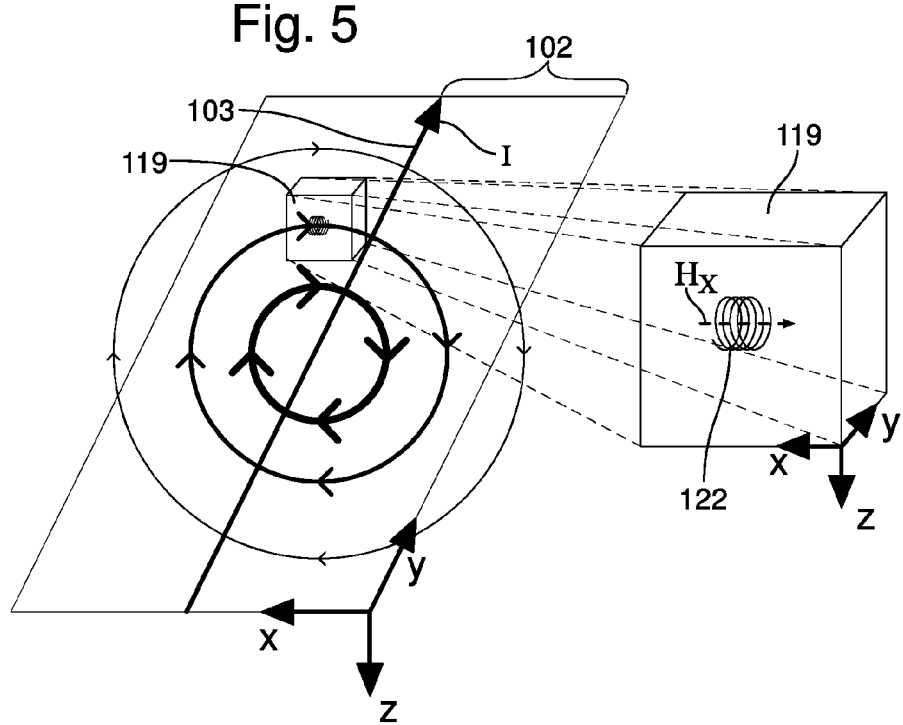
FIG. 5 is a schematic illustration of a boundary sensing system with a boundary sensor assembly according to an additional aspect of the invention.

According to one embodiment shown in FIG. 5, adding a pickup coil 122 oriented so as to be sensitive to the x-axis of the boundary sensor assembly 119 can provide supplemental information on the horizontal component $H_x$ of the magnetic field H, provided that the coordinate x of the boundary sensor assembly 119 and the coordinate X of the boundary wire 103 are parallel to each other. As FIG. 5 illustrates, the component $H_x$ reaches a maximum where the component $H_z$ changes the sign, i.e. where the boundary sensor assembly is located directly above the boundary wire 103 at a horizontal distance $\Delta X$ equal to zero.

Figure 6:
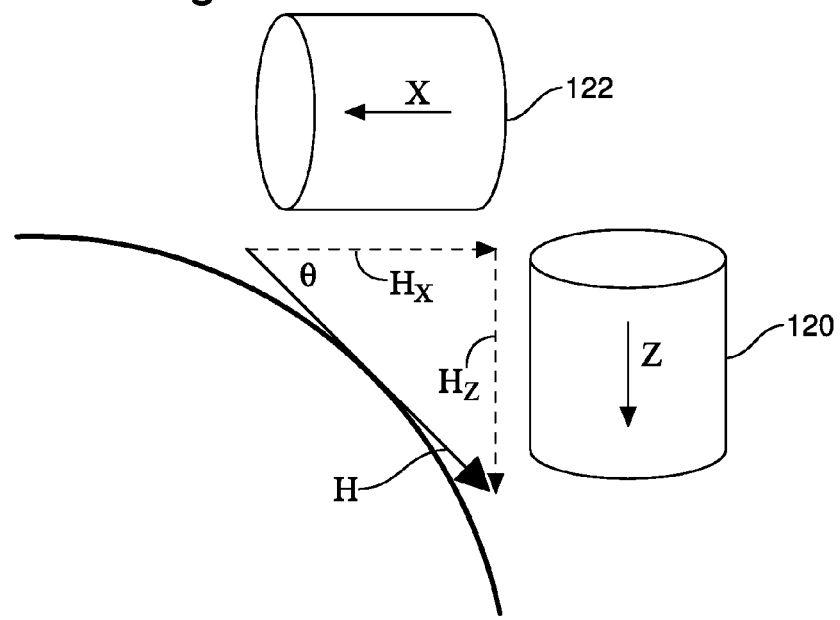
FIG. 6 is a schematic illustration of a boundary sensing system with a boundary sensor assembly including both of the boundary sensors of FIGS. 2 and 5.
Figure 7:
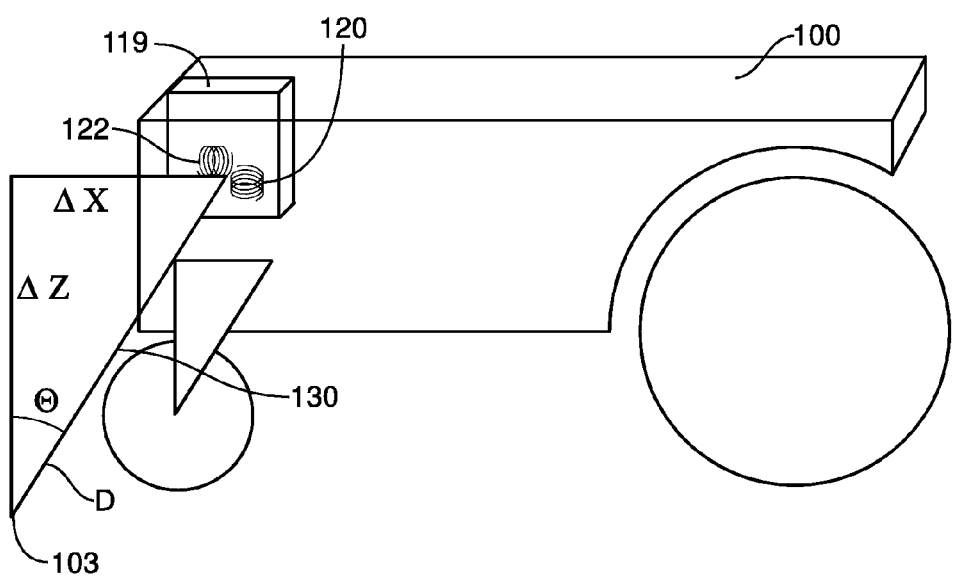
FIG. 7 is a schematic illustration of a robotic mower with the boundary sensing system of FIG. 6.

As shown in FIGS. 6 and 7, the boundary sensor assembly 119 is illustrated with both the vertically sensitive pickup coil 120 and the horizontally sensitive pickup coil 122. The magnetic field H flows in a direction that forms an angle $\Theta$ with a horizontal plane as shown in FIG. 7. The magnetic field H is perpendicular to a radial line 130 connecting the boundary wire 103 with the boundary sensor assembly 119 indicating the total distance D from the boundary wire 103 to the boundary sensor assembly 119. Thus, the angle $\Theta$ also represents the angle between the radial line 130 and the vertical axis Z as indicated in FIG. 7. Accordingly, the following equation applies:

$$\Delta X = \Delta Z \cdot \tan \Theta \quad (1)$$

Because the magnetic field strength H generated by a linear wire is generally proportional to the inverse of the distance D, the relationship between the horizontal component $H_x$ and the vertical component $H_z$ allows an approximate calculation of the angle $\Theta$:

$$\Theta = a\tan(H_z/H_x) \quad (2)$$

Because the vertical distance $\Delta Z$ between the boundary wire 103 and the boundary sensor assembly 119 is known from the geometry of the lawnmower 100 and from the installation of the boundary wire 103, the horizontal distance $\Delta X$ of the boundary sensor assembly 119 to the boundary wire 103 can be determined based on $\Theta$ and $\Delta Z$ according to equation (1).

So far, sensor signals have been discussed that occur when the coordinate x of the boundary sensor assembly 119 and the coordinate X of the boundary wire 103 are parallel to each other. The lawn mower 100, however, may approach the boundary wire 103 at an oblique or yaw angle $\psi$. The yaw angle $\psi$ defines a horizontal rotation of the boundary sensor assembly 119 about the vertical axis z.

Figure 8:
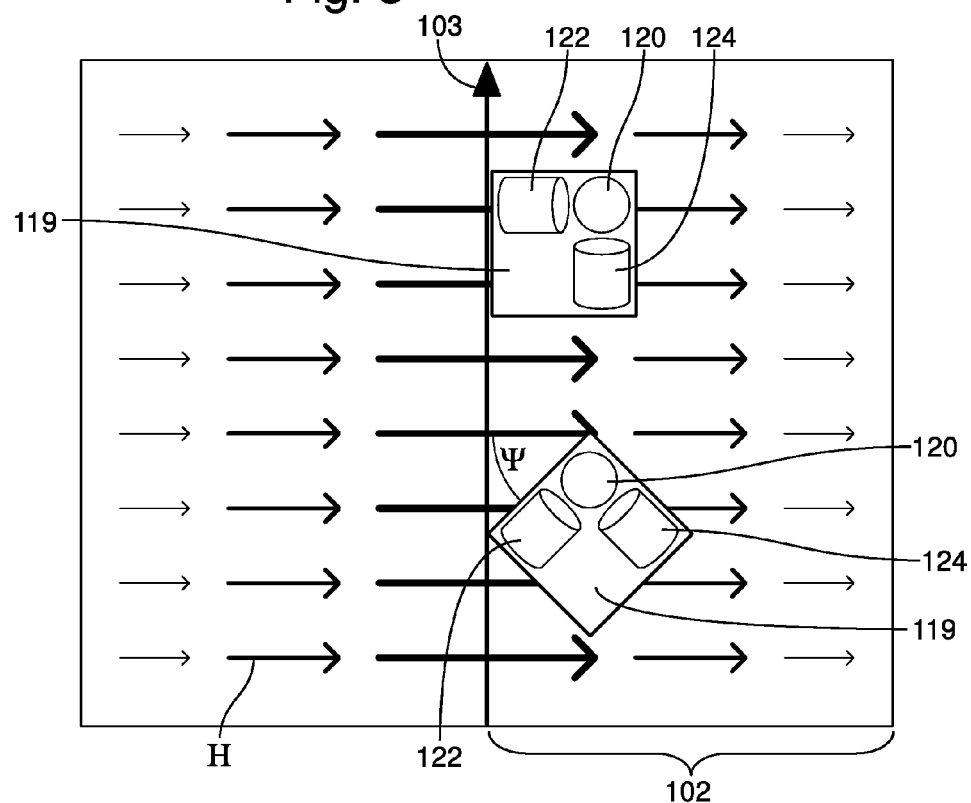
FIG. 8 is a schematic illustration of a boundary sensing system with a boundary sensor assembly according to a further preferred embodiment of the invention.
Figure 9:
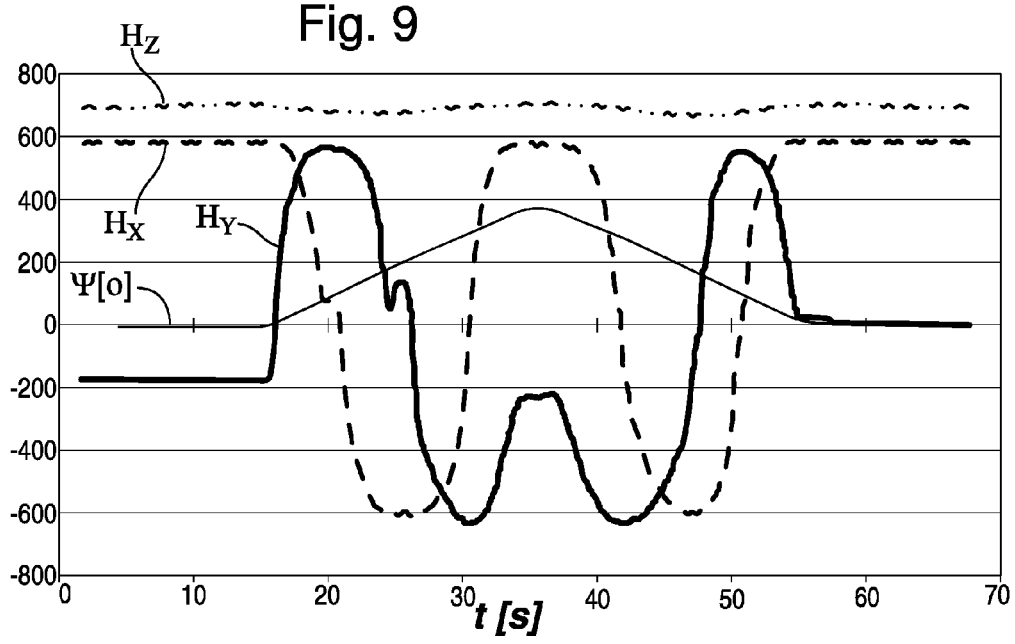
FIG. 9 is a diagram depicting graphs representing pickup coil signals of a boundary sensing system according to FIG. 8.

In a further embodiment shown in FIG. 8, a second horizontal pickup coil 124 is included in the boundary sensor assembly 119. FIG. 8 shows the boundary wire 103 and two identical boundary sensor assemblies 119 in a birds-eye perspective. Only an above-ground portion of the magnetic field H is indicated by arrows of varying weight. The boundary sensor assembly 119 shown at the top of FIG. 9 is oriented with respect to the boundary wire 103 at a yaw angle $\Psi$ equal to zero, at which the coordinates z and Z are parallel to each other. The boundary sensor assembly 119 shown at the bottom of FIG. 9 is oriented with respect to the boundary wire 103 at a yaw angle $\Psi$ different than zero. As the boundary sensor assembly rotates from the orientation at the top to the orientation at the bottom, the pickup coil 120 sensitive to the vertical component $H_z$ detects a generally constant signal because the pickup coil 120 does not change its orientation relative to its axis of sensitivity. The two other pickup coils 122 and 124, however, move out of their alignment with the stationary axes X and Y.

FIG. 9 illustrates a diagram of signal strengths picked up by pickup coils generally arranged along the three Cartesian coordinates x, y, and z of the boundary sensor assembly 119. The individual graphs represent the yaw angle ψ in degrees and the individual magnetic field strength components $H_x$, $H_y$, and $H_z$ along the coordinates x, y, and z of the boundary sensor assembly 119 in arbitrary units over time. During a yaw movement, the vertical component $H_z$ in sensor assembly coordinates is generally the same as the vertical component $H_z$ in boundary wire coordinates and thus remains about constant.

The x and y components of $H_x$ and $H_y$ in sensor assembly coordinates, however, show a sine-cosine relationship to each other because their angle Ψ relative to the corresponding boundary wire coordinates change during the yaw rotation. In FIG. 9, the boundary sensor assembly 119 first makes a 360° rotation in one direction in the time span between about 15 seconds and 35 seconds, and then a reverse rotation back to the original orientation in the time span of 35 seconds to 55 seconds, as indicated by the graph of the yaw angle ψ.

By mounting the two horizontal, preferably perpendicular, pickup coils 122 and 124 in the boundary sensor assembly 119, the horizontal distance of the boundary sensor assembly from the boundary wire 103 can be calculated from the Pythagorean Theorem:

$$\Delta X^2 = \Delta x^2 + \Delta y^2 \quad (3)$$

Equation (3) presumes that the specified area 102 is approximately horizontal in the proximity of the boundary wire 103. In order to account for a slope that may result in a non-zero pitch angle Θ between the sensor assembly coordinate x and the horizontal XY plane or in a non-zero roll angle Φ between the sensor assembly coordinate y and the horizontal XY plane, geometric calculations based on the considerations of equations (1) and (2) can compensate for slopes where the depth is known at which the boundary wire 103 is buried.

Optionally, adjustment factors for the signals of individual pickup coils 120, 122, and 124 can be calibrated under known conditions in test runs of the robotic lawn mower 100 on the specified area 102 with a boundary wire 103 installed along a known path at a known depth.

Figure 10:
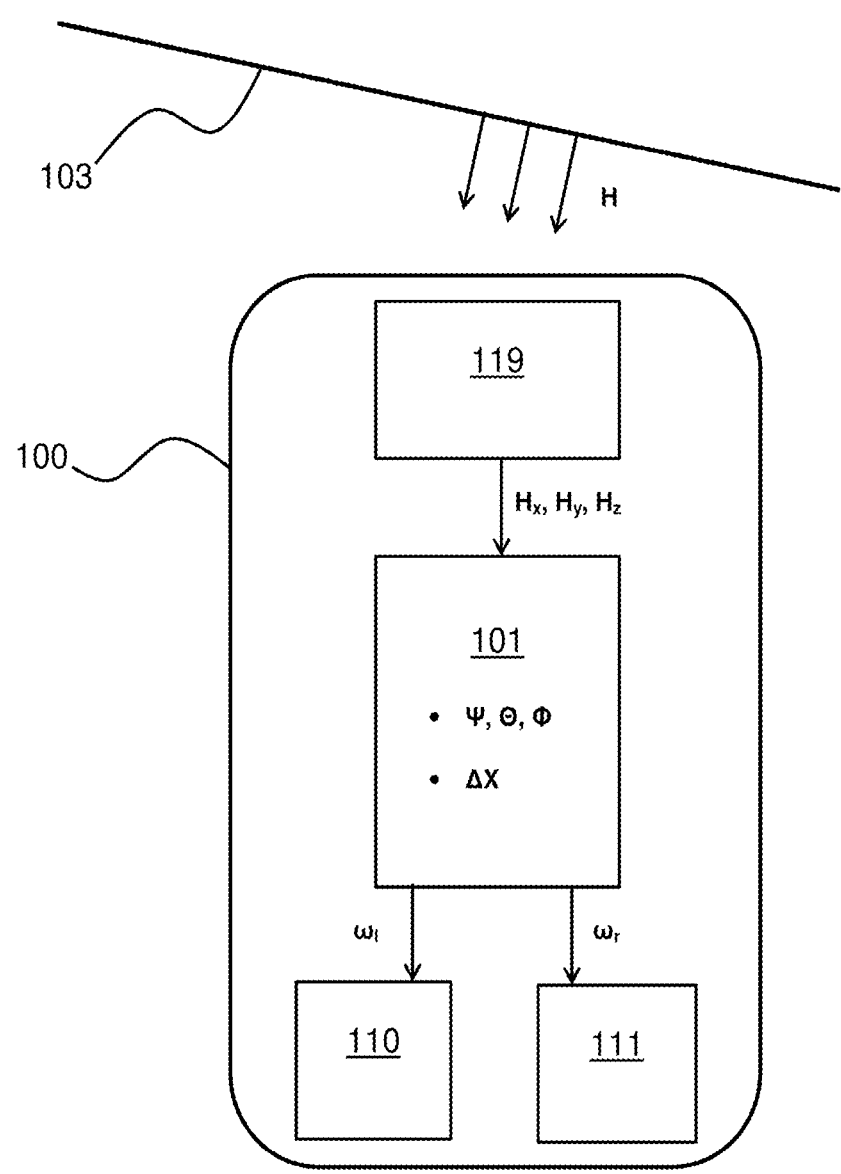
FIG. 10 is a schematic block diagram of a robotic mower with a boundary sensing system according to FIG. 8 according to another aspect of the present invention.

Referring now to FIG. 10, a control system for the robotic mower 100 utilizes one or more boundary sensors 119 for detecting the amplitudes of components $H_x$, $H_y$, and $H_z$ of the magnetic field H emitted by the boundary wire 103. The arrows indicating magnetic field H are only symbolic and do not represent actual field lines. The one of more boundary sensors 119 transmit signals representing the amplitudes of the components $H_x$, $H_y$, and $H_z$ to the VCU 101.

The VCU 101 can determine current coordinates from the measured amplitudes of the components $H_x$, $H_y$, and $H_z$. For example, yaw angle Ψ, pitch angle Θ, and roll angle Φ can be calculated from the ratio of the amplitudes of components $H_x$, $H_y$, and $H_z$, as equation (2) demonstrates for the yaw angle Ψ. Further, the absolute amplitudes of components $H_x$, $H_y$, and $H_z$ allow the VCU 101 to determine the horizontal distance ΔX from the boundary wire.

Once these quantities have been determined, the VCU can then apply a control algorithm for generating commands to the traction motors 110 and 111 to make the mower 100 follow a desired behavior. The desired behavior is at least in part preprogrammed in the VCU 101, but may additionally be altered by user input via the user interface module 107 shown in FIG. 1. The control algorithm translates the desired behavior based on the calculated coordinates into angular velocities $\omega_l$ for the traction motor 110 on the left side of the mower 100 and $\omega_r$ for the traction motor 111 on the right side of the mower 100. The angular velocities $\omega_l$ and $\omega_r$ may be positive, negative, or zero and may differ from each other in sign and amplitude, depending on the desired behavior. The VCU 101 sends a signal causing the left traction motor 110 to operate at the angular velocity $\omega_l$ to the left traction motor 110 and a signal causing the right traction motor 111 to operate at the angular velocity $\omega_r$ to the right traction motor 111. Notably, the signals sent to the traction motors 110 and 111 by the VCU may also represent torque or any other quantity correlated with a wheel rotation causing the desired behavior.

Figure 11:
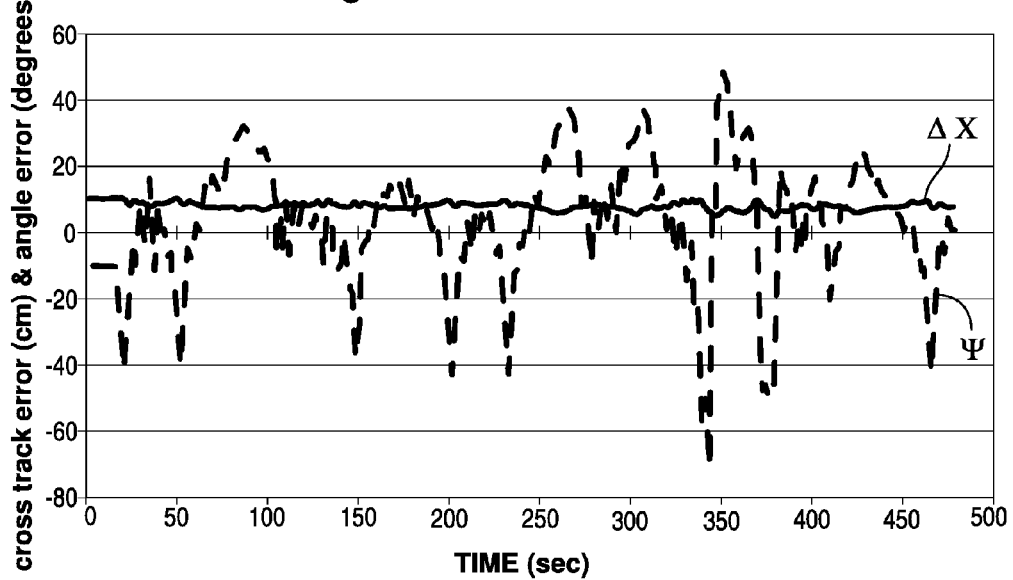
FIG. 11 is a diagram of an experimental plotted autonomous course correction of a robotic lawn mower equipped with a boundary sensing system according to FIG. 8.

FIG. 11 illustrates one example of an autonomous course correction by a robotic lawn mower with a boundary sensor assembly that includes three pickup coils, for example pickup coils 120, 122, and 124 and a control system similar to that of FIG. 10. The VCU 101 receives the signals from pickup coils 120, 122, and 124 that represent $H_z$, $H_x$, and $H_y$. The robotic lawn mower has the goal of keeping the boundary sensor assembly at a constant distance ΔX=10 m from the boundary wire 103. Based on the signals from the pickup coils 120, 122, and 124, the VCU 101 calculates corrective turns determining a yaw angle Ψ relative to the boundary wire 103. The yaw angle Ψ indicates the angle between the coordinate x and the coordinate X, or the identical angle between the coordinate y and the coordinate Y. The corrective actions are translated into control signals sent to left and right traction motors 110 and 111. The traction motors 110 and 111 operate as a brake steer system, where a relative speed difference between the two traction motors 110 and 111 results in yaw movement. The VCU thus directs the robotic lawnmower to continuously adjust the yaw angle Ψ. As the plotted graph for the horizontal distance ΔX from the boundary wire 103 shows, the corrective calculations by the VCU 101 based on the signals from the boundary sensor assembly 119 are sufficiently accurate for guiding the lawn mower 100 within a fairly small deviation from the target distance.

It is evident from the foregoing description that obtaining signals from a boundary sensor assembly 119 with at least two pickup coils 120 and 122 arranged in different orientations leads to a significant improvement in calculating the boundaries of the specified area 102. Further, evaluating analog amplitudes of the magnetic field instead of recording purely digital changes in the sign of the magnetic field H allows a calculation of the horizontal distance between the boundary sensor assembly 119 and the boundary wire 103. Thus, the VCU 101 of the robotic mower 100 can be programmed to turn around at any distance ΔX from the boundary wire 103 that is within the range of a detectable magnetic field H, even outside the specified area 102. For example, a virtual map with the path of the boundary wire 103 can be stored in the VCU, and an operator may select locally varying distances from the boundary wire at which the robotic mower turns around. Also, because the robotic mower 100 recognizes early on, due to the analog signals, that it approaches the boundary wire 103, it can be operated at a higher average speed because it does not depend on the sudden change of signs in the magnetic field H. Based on the rotary speed of the fraction motors 110 and 111, the VCU 101 can detect low-traction conditions if the robotic mower 100 moves relative to the boundary wire 103 at a lower speed than indicated by the fraction motors 110 and 111.

While the described embodiments incorporate pickup coil arrangements with axes of sensitivity that correspond to the coordinates of an orthogonal coordinate system, any combination of pickup coil orientations is suitable in which any two axes of sensitivity form a non-zero angle between each other. If a third pickup coil is present, it can account for the third dimension if it is arranged to be sensitive along an axis that intersects with a plane defined by the orientations of the other two axes. But a third pickup coil can also be arranged along a plane defined by the orientations of the first two pickup coils to establish redundancy.

Figure 12:
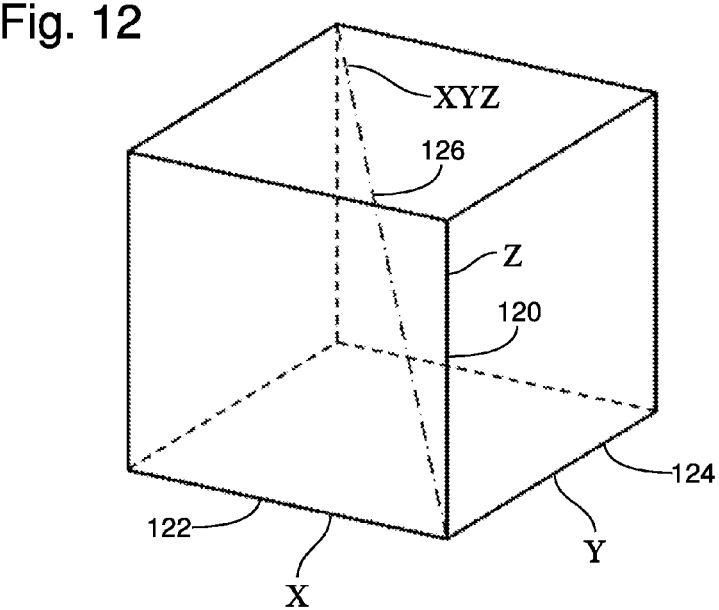
FIG. 12 is a schematic illustration of a boundary sensing system with a boundary sensor assembly according to a further preferred embodiment of the invention.

According to one embodiment, in order to detect any failure of one of the pickup coils, an additional, redundant pickup coil 126 can be included in the boundary sensor assembly 119 as schematically illustrated in FIG. 12. The axes of sensitivity of three pickup coils 120, 122, and 124 may extend along edges x, y, and z of a cube or of a parallelepiped (also called rhomboid). An additional, fourth pickup coil 126 for redundancy is mounted in an orientation xyz that shares a component with each one of the first three pickup coils 120, 122, and 124. While the first three pickup coils 120, 122, and 124 represent independent vectors, the signal $H_{xyz}$ of the fourth pickup coil 126 can be calculated from the signals $H_x$, $H_y$, and $H_z$ of the first three pickup coils 120, 122, and 124. When the measured signal $H_{xyz}$ of the fourth pickup coil 126 is consistent with the calculated signal, the VCU 101 can assume that all pickup coils operate properly. If the signal $H_{xyz}$ of the fourth pickup coil deviates from the calculated signal by more than a predetermined error margin, the VCU can establish that the boundary sensor assembly is defective and needs repair or replacement. The error margin depends on the overall precision of the measured signals and can be predetermined by empirical measurements and stored in a memory of the VCU 101.

FIG. 12 shows the orientations of the first three pickup coils 120, 122, and 124 to be perpendicular to each other. This is only one example of orientations. The four pickup coils forming the boundary sensor assembly 119 may be arranged at any orientations relative to each other, in which no more than two of the axes of sensitivity lie in one common plane. For example, orientations of all four axes of sensitivity may form identical angles relative to each other as can be visualized by the shape of a tetrahedron with axes pointing from the center of the tetrahedron to each of the four corners.

For improving the signal-noise ratio of the sensor signals, a finite gain may be applied to the signals of the individual pickup coils 120, 122, 124, and 126 before the signals are fed into the VCU 101.

Figure 13:
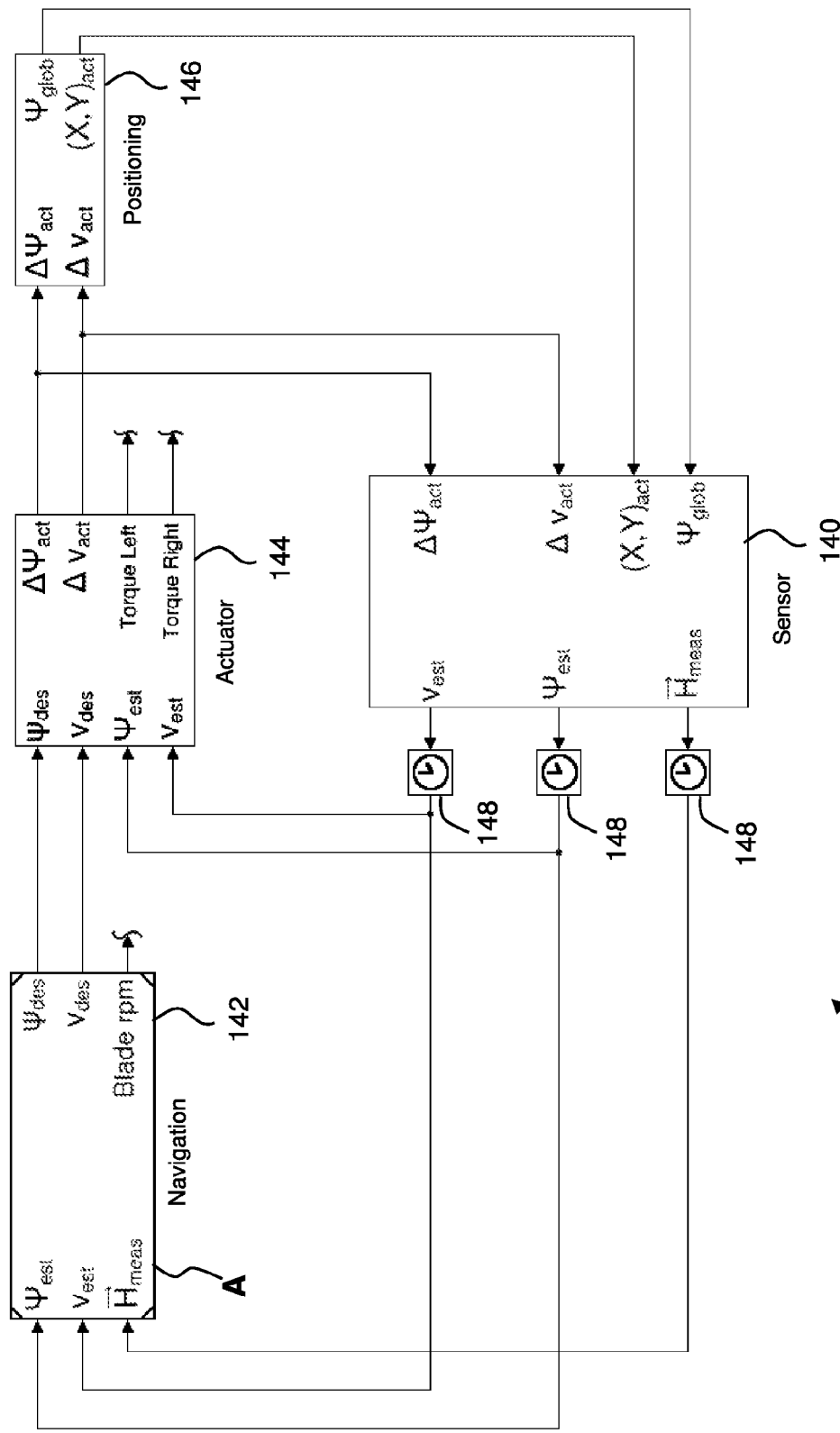
FIG. 13 is a schematic block diagram of portions of a vehicle control unit (VCU) for a mower equipped with a boundary sensor assembly sensitive to a magnetic field of a boundary wire at least in two horizontal directions, according to a further aspect of the invention.

Now referring to FIG. 13, the mower VCU 101 may comprise logical modules performing different tasks. Notably, all logical modules represent logical steps, not necessarily physical arrangements. Thus the logical modules may share processing and memory resources with each other or comprise individual processing and storage capacities. Evidently, a portion of the logical modules may share a portion of resources with each other while some resources may be assigned to only one of the logical modules. In the embodiment of FIG. 13, four logical modules are shown, namely a sensor module 140, a navigation module 142, an actuator module 144, and a positioning module 146. For example, the sensor module may have an allocated individual processor for processing magnetic field information received from a sensor assembly.

The sensor module 140 generates output information representative of a measured magnetic field vector $\vec{H}_{meas}$ that contains at least information on a horizontal Y component and a horizontal X component of a magnetic field H generated by the boundary wire 103, where it is assumed for simplicity in this context that the X component and the Y component are output in mower-based coordinates that are perpendicular to each other. The magnetic field H may be measured with a sensor assembly 119 as introduced in the previous figures or with any other sensor assembly outputting an analog signal that signifies the amplitude and the direction of the horizontal component of the magnetic field H generated by the boundary wire 103. The sensor module 140 further generates an output of an estimated mower speed vector $\vec{v}_{est}$ that may be expressed as an estimated magnitude $v_{est}$ and an estimated yaw angle $\Psi_{est}$ in boundary wire coordinates. The estimated speed vector $\vec{v}_{est}$ may, for example, be an extrapolation of previously established data based on executed behavior since the last calculation of the estimated speed vector $\vec{v}_{est}$.

Clock symbols 148 in the information path from the sensor module 140 to the navigation module 142 indicate real-time processing, where the sensor module 140 generates information based on one control cycle and that information is fed to the navigation module 142 for a subsequent control cycle, thus establishing a closed-loop control due to the sensory feedback.

The navigation module 142 receives the data output generated by the sensor module and calculates a desired path based on the location and orientation of the mower 100. The navigation module will be explained in greater detail in connection with subsequent FIGS. 14, 15, and 17.

The navigation system generates output information representative of a desired speed vector $\vec{v}_{des}$ that may be expressed as a desired magnitude $v_{des}$ and a desired yaw angle $\Psi_{des}$. Depending on the desired navigation behavior, the navigation module may also generate output information regarding the rotational speed of a cutting blade assembly. For example, the rotational speed of the cutting blade assembly may be reduced while the mower is propagating in an arc compared to a straight line.

The information on the desired speed vector $\vec{v}_{des}$ is i passed to the actuator module 144. The actuator module 144 also receives the information on the estimated speed vector $\vec{v}_{est}$. The actuator module compares the desired speed vector $\vec{v}_{des}$ with the estimated $\vec{v}_{est}$ and translates the difference in to a vector difference $\Delta \vec{v}_{act}$ that may be expressed as a magnitude difference $\Delta v_{act}$ and a yaw angle difference $\Delta \Psi_{act}$. Expressing the results as differences in magnitude $\Delta v_{act}$ and angle $\Delta \Psi_{act}$ has the benefit that the differences are the same regardless of the coordinate system. Thus, the differences $\Delta v_{act}$ and $\Delta \Psi_{act}$ calculated in the boundary wire coordinate system can be adopted in the mower based coordinate system without any further transformation. The yaw angle difference $\Delta \Psi_{act}$ directly translates into a torque difference between left and right traction motors 110 and 111 of the mower 100. The magnitude difference $\Delta v_{act}$ directly translates into a change in the torque average of the two traction motors. Thus, based on the calculated differences, the actuator module 144 generates torque commands to the left traction motor 110 and the right traction motor 111. Further, the actuator module 144 supplies the information on the calculated differences $\Delta v_{act}$ and $\Delta \Psi_{act}$ to the positioning module 146 and to the sensor module 140.

The positioning module 146 processes the differences $\Delta v_{act}$ and $\Delta \Psi_{act}$ along with previously stored positioning information and calculates a global orientation $\Psi_{glob}$ and an actual position $(X,Y)_{act}$ of the mower 100. The global orientation $\Psi_{glob}$ and the actual position $(X,Y)_{act}$ designate a position and orientation of the mower relative to the specified area 102 rather than the boundary wire 103 or the mower 100. Because the boundary wire 103 describes a loop, the coordinate system of the boundary wire 103 changes in absolute coordinates depending on the section of boundary wire on which the coordinates are based. The global orientation $\Psi_{glob}$ and the actual position $(X,Y)_{act}$ are based on earth-bound coordinates and thus give information on where and in which orientation the mower is located and moving within the specified area 102, even when no magnetic field is detectable. The positioning module may, for instance, integrate the speed vector over time to arrive at a current position and average the yaw angle differences to arrive at a current orientation. The positioning module supplies the information on global orientation $\Psi_{glob}$ and actual position $(X,Y)_{act}$ to the sensor module 140 for further processing.

The sensor module 140 also receives the information on the differences $\Delta v_{act}$ and $\Delta \Psi_{act}$ from the actuator module 144. With this calculated information and the measured magnetic field H originating from the physical sensor assembly, the sensor module 140 calculates the estimated speed vector $\vec{v}_{est}$ as described above.

Figure 14:
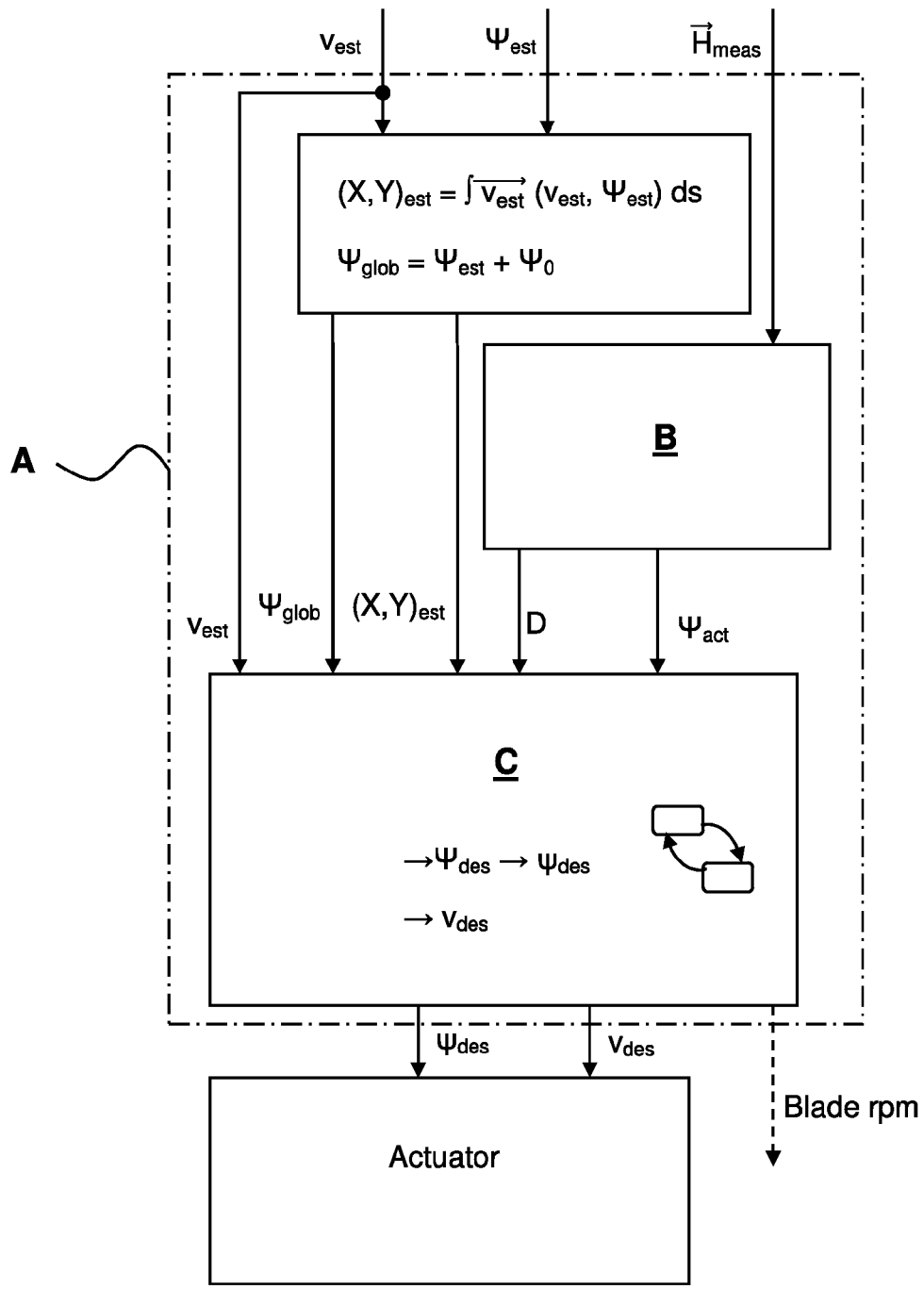
FIG. 14 is a block diagram of a detail of the VCU of FIG. 13, depicting a navigation controller.

FIG. 14 shows a navigation module that may represent the navigation module 142 designated as block A in FIG. 13. It receives the input information on the estimated speed vector $\vec{v}_{est}$, for example represented by estimated magnitude $v_{est}$ and an estimated yaw angle $\Psi_{est}$ in boundary wire coordinates. The navigation module further receives the information on the measured magnetic field vector $\vec{H}_{meas}$. The speed vector information $\vec{v}_{est}$ is optionally processed to calculate an estimated position $(X,Y)_{est}$ and the global yaw rate $\Psi_{glob}$. Alternatively, similar information may be obtained from the positioning module 146, represented by the positioning module that calculated the global yaw rate $\Psi_{glob}$ and the actual position $(X,Y)_{act}$ in a previous cycle.

In box B, the sensor signal of the measured magnetic field vector $\vec{H}_{meas}$ are processed to calculate the distance D between the mower 100 and the boundary wire 103 as well as the current yaw angle $\Psi_{act}$ of the mower 100 in boundary wire coordinates. The processes within box B will be described in greater detail in connection with FIG. 15.

The following quantities are then supplied to block C, representing a navigation arbitration: information on the estimated speed vector $\vec{v}_{est}$, on the estimated position $(X,Y)_{est}$, on the distance D between the mower 100 and the boundary wire 103, on the current yaw angle $\Psi_{act}$ in boundary wire coordinates and on the global yaw angle $\Psi_{glob}$ in absolute coordinates of the specified area 102. The arbitration navigation in block C processes these input quantities and outputs target values for the desired speed vector $\vec{v}_{des}$, for example represented by the desired speed magnitude $v_{des}$ and the desired yaw angle $\Psi_{des}$ in boundary wire coordinates. As mentioned above, information relating to the desired rotational speed of the mower blade may also be supplied. Further details of the processes within block C will be described in more detail with reference to FIG. 17.

Figure 15:
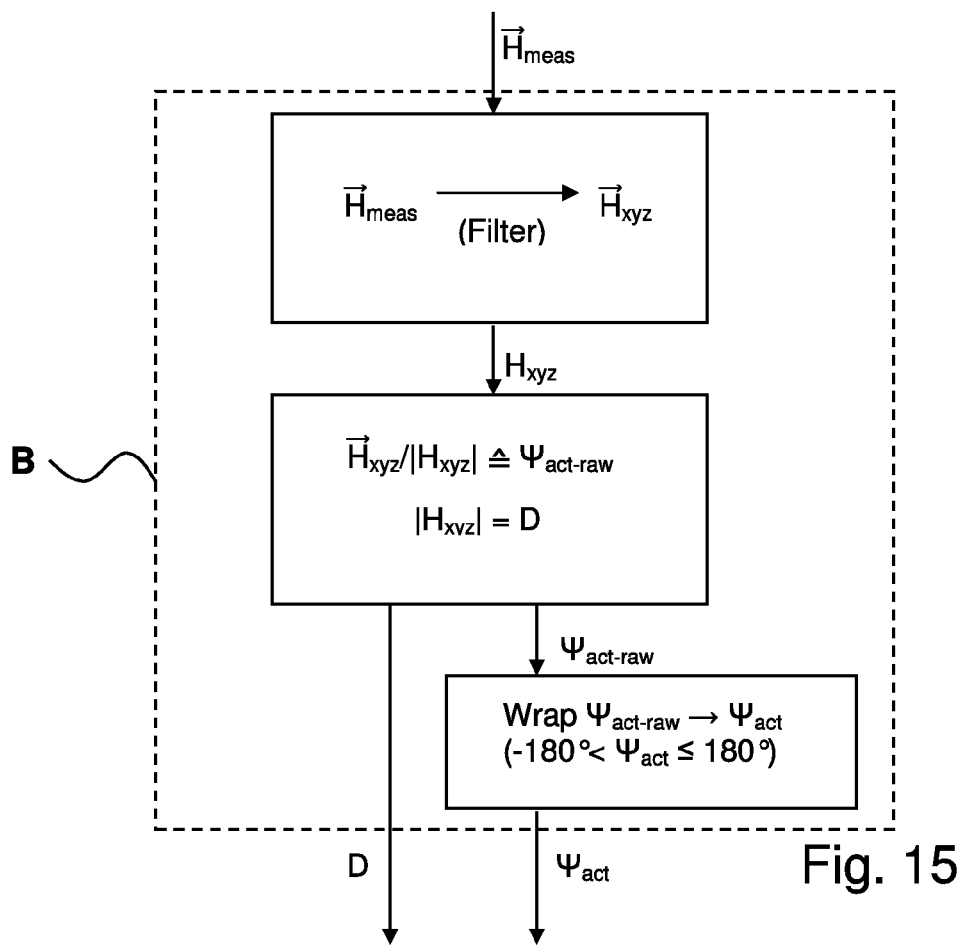
FIG. 15 is a block diagram of a detail of the navigation controller of FIG. 14, dealing with translating measured sensor signals into distance and orientation relative to the boundary wire and relative to a specified area to be mowed.

Now referring to FIG. 15 the signal $\vec{H}_{meas}$, representing the magnetic field vector measured by the sensor assembly may be conditioned for further processing if so desired. For improving the signal-noise ratio and for smoothing, known filters and passes may be applied that are known in the art. The resulting conditioned information $\vec{H}_{xyz}$ on the magnetic field vector or, absent any filters, the measured sensor signal $\vec{H}_{meas}$ is then processed to obtain an actual raw yaw angle $\Delta\Psi_{act-raw}$ in boundary wire coordinates. The raw yaw angle $\Delta\Psi_{act\,raw}$ is an example of representing a unit vector in the orientation in which the mower is currently facing. The unit vector is obtained by normalizing the magnetic field vector, $\vec{H}_{xyz}$ or $\vec{H}_{meas}$, respectively, and transforming this unit vector into boundary wire coordinates.

Figure 16:
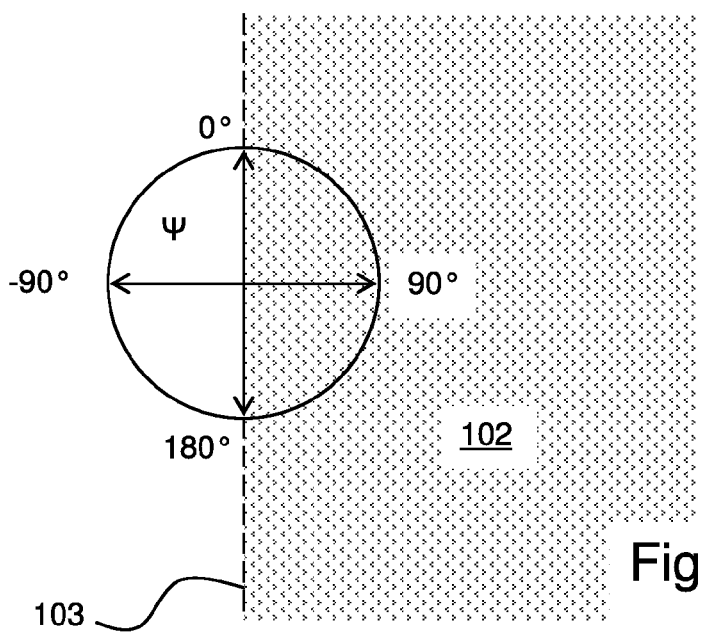
FIG. 16 is an illustration of a yaw angle range in wire-bound coordinates.

The raw actual yaw angle $\Delta\Psi_{act\,raw}$ may undergo wrapping modulo 360° to be represented by a value in the range of $(-180°)<\Psi_{act}\leq180°$. A suitable coordinate convention for the boundary-wire-based yaw angle $\Psi$ is shown in FIG. 16. In the chosen convention, a direction from the specified area 102 outward toward the boundary wire 103 is represented by a yaw angle $\Psi$ with a negative sign. An inward movement from the boundary wire 103 into the specified area 102 is designated with a positive sign. Accordingly, the raw actual yaw angle $\Delta\Psi_{act\,raw}$ can be wrapped to take a value within this range.

Figure 17:
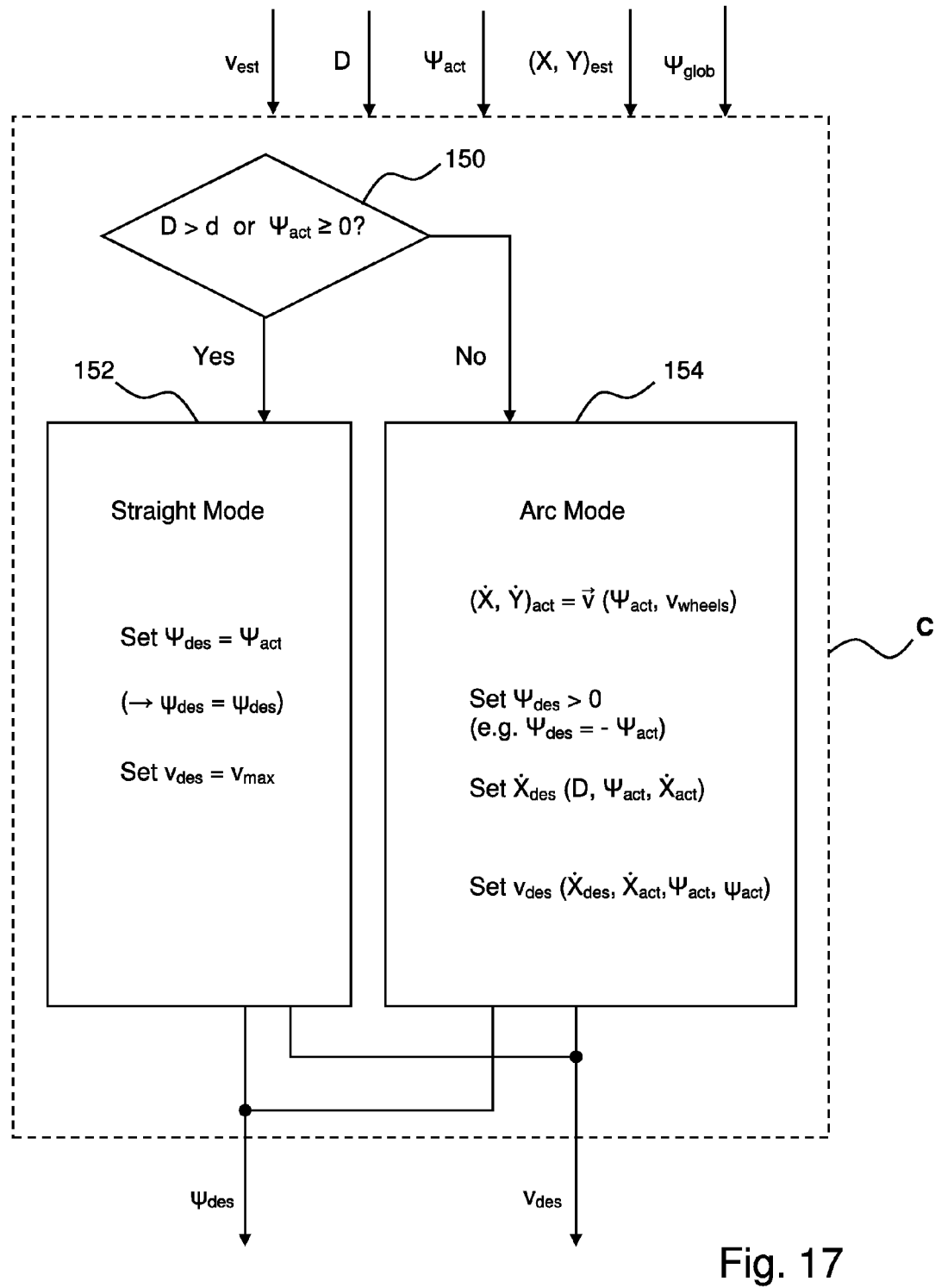
FIG. 17 is a block diagram of a further detail of FIG. 14 dealing with generating target values based on a selected one of two modes of propagation.

Now referring to FIG. 17, the navigation arbitration of block C receives information on the estimated speed vector $\vec{v}_{est}$, on the estimated absolute position $(X,Y)_{est}$ of the mower, on the distance D between the mower 100 and the boundary wire 103, on the current yaw angle $\Psi_{act}$ in boundary wire coordinates and on the global yaw angle $\Psi_{glob}$ in absolute coordinates of the specified area 102.

The navigation arbitration makes a decision in step 150 to enter into one of two propagation modes 152 and 154, a straight mode 152 or an arc mode 154. Generally, if the autonomous mower 100 approaches the boundary wire 103, it preferably has a suitable control for changing its course in order not to leave the specified area 102. The boundary wire 103 designates the boundary of the specified area 102 that the mower 100 preferably does not leave. Thus, the mower 100 preferably starts taking a turn at a specified turn distance from the boundary wire before the mower reaches the boundary wire. In step 150, this distance at which the mower starts to turn is designated as distance d. The distance d may, for example, be composed of a desired turn radius plus a blade radius so that the mower blades tangentially reach the boundary wire 103 during a turn. Alternatively, the boundary wire 103 may be arranged at a distance from the boundary of the specified area that corresponds to the specified turn distance. Then the mower may start a turn when it reaches the boundary wire 103. The latter principle, however, is similar to the former in that a turn is initiated before the mower 100 reaches the boundary of the specified area 102.

In the example shown in FIG. 17, the navigation arbitration considers two conditions, whether the current distance D between the mower 100 and the boundary wire 103 is at most equal to the specified turn distance d and whether the mower 100 is approaching the boundary wire. If the distance D is greater than the specified turn distance d or if the mower 100 is moving away or parallel to the boundary wire ($\Psi_{act}\geq0$), the navigation arbitration selects the straight mode 152. Conversely, if the distance D is equal to or smaller than the specified turn distance d, the arc mode 154 is selected.

In the straight mode 152, the mower 100 stays on a straight path. Accordingly, the current actual yaw angle $\Psi_{act}$ in boundary wire coordinates is set to be the desired yaw angle $\Psi_{des}$. In mower-bound coordinates, the desired yaw angle $\psi_{des}$ also remains the same as the current yaw angle $\psi_{act}$. because the mower 100 does not need to take any turns, the desired speed magnitude $v_{des}$ may be set to the maximum sustainable mower speed $v_{max}$ converted in the actuator module 144 into equal maximum torques generated by both traction motors 110 and 111.

In the described embodiment, the mower-based yaw angle $\psi_{act}$ is the angular deviation of the orientation of the mower 100 from the mower's original orientation, for example at the time of its departure from the charging station 105. Thus, along the entire path of the mower 100 over time, the mower yaw angle $\psi_{act}$ is offset by a constant angle from the global yaw angle $\Psi_{glob}$. The offset of the mower-based yaw angle $\psi_{act}$ from the yaw angle $\Psi_{act}$ in boundary wire coordinates depends on the direction of the respective section of the boundary wire 103 whose magnetic field the sensor assembly is currently detecting. The boundary-wire based coordinates do not exist in areas where no magnetic field H of the boundary wire 103 is detectable by the sensor assembly.

The navigation arbitration exits the straight mode 152 and enters the arc mode 154 when the above-described conditions for entering the arc mode are met. In the arc mode, the desired yaw angle $\Psi_{des}$ in boundary wire coordinates is set to a positive value, i.e. to an orientation pointing into the specified area 102.

Figure 18:
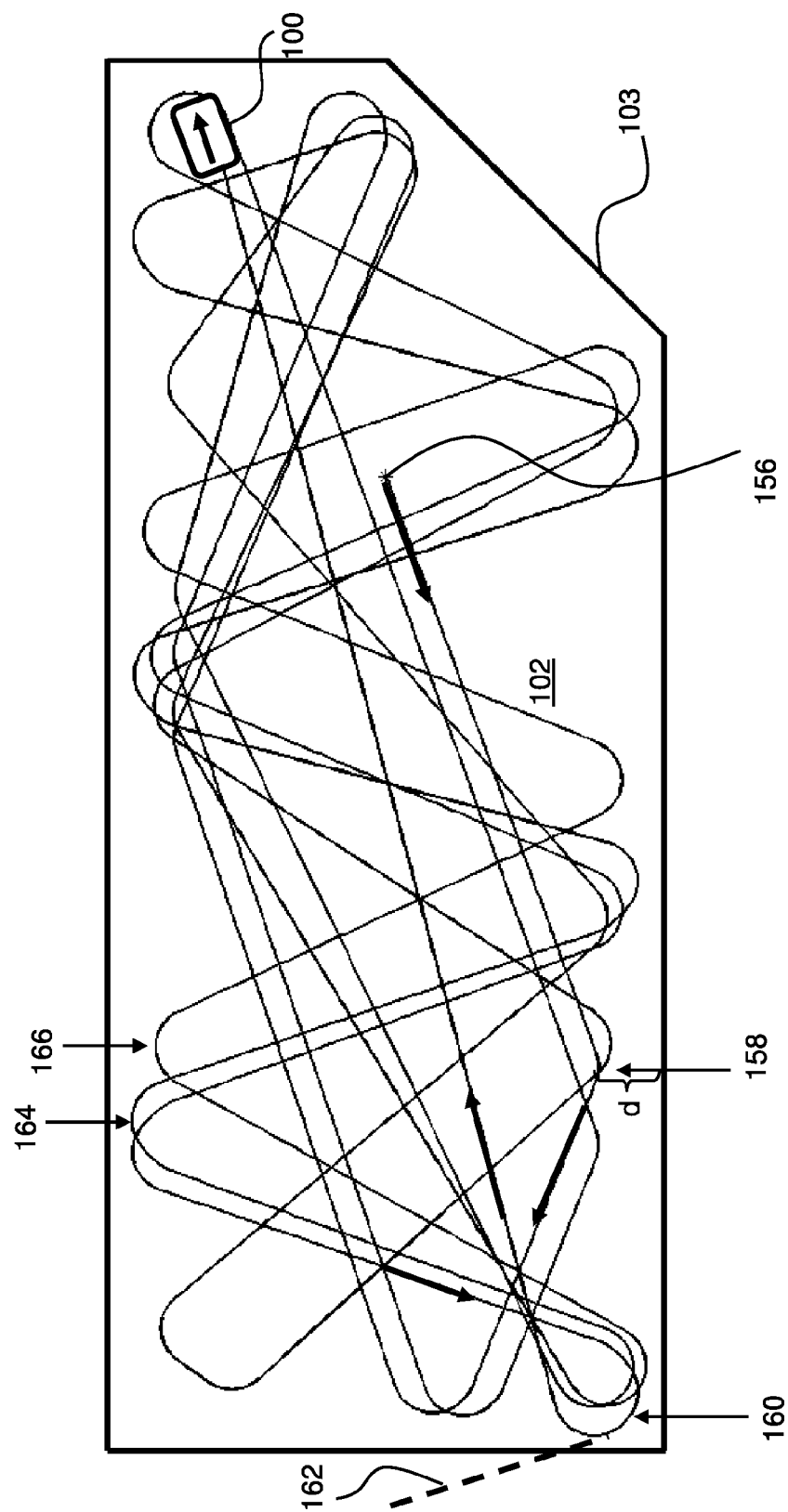
FIG. 18 is a birds-eye view on a mowing pattern according to one example of navigation rules.

One example of selecting the desired yaw angle $\Psi_{des}$ consists of reversing the sign of the actual yaw angle ($\Psi_{des}=-\Psi_{act}$). This setting results in a mirror reflection of the actual yaw angle $\Psi_{act}$ at a vertical plane extending along the boundary wire 103. The resulting mowing pattern is illustrated in FIG. 18 and appears random. It may cover a convex or concave specified area 102 because the mower will eventually reach every location within the specified area 102.

Another option of selecting the desired yaw angle $\Psi_{des}$ may consist in 180° to the actual yaw angle $\Psi_{act}$ and to alternate the turn direction between clockwise and counter-clockwise. Such a setting would result in parallel tracks systematically covering the specified area 102. For the latter setting, the charging station 105 or a designated starting point is preferably located in a corner of the specified area, where the initial orientation extends parallel to a section of the boundary wire. The shape of the specified area 102 for mowing in parallel tracks is preferably convex.

Because the mower has to navigate an arc, the desired speed $v_{des}$ may be set lower than in the straight mode. The desired speed $v_{des}$ may be a preset value or depend on the distance D from the boundary wire and other factors, such as the current speed vector $\vec{v}_{act}$ calculated from the actual yaw angle $\Psi_{act}$ in boundary wire coordinates and from the current speed magnitude based on the mean rotational speed $v_{wheels}$ of the mower wheels. In the depicted embodiment, only the desired X component $\dot{X}_{des}$ of the speed perpendicular to the boundary wire is varied based on the distance D, on the actual yaw angle $\Psi_{act}$ in boundary wire coordinates, and on the magnitude of the X component of the actual speed $\dot{X}_{act}$ relative to the boundary wire 103. The Y component $\dot{Y}_{des}$ parallel to the boundary wire may remain constant, resulting in a variable overall speed $v_{des}$ as shown in FIG. 17. Alternatively, the overall speed $v_{des}$ may be constant, resulting in a variable Y component $\dot{Y}_{des}$. Many variations of these concepts are within the scope of the present invention including combinations of the above considerations and additional variables influencing the turn behavior of the mower 100.

While the arc mode is initiated when the mower 100 is located at the distance d from the boundary wire 103, wheel slip may prevent an immediate turn. Wet or tall grass is fairly slippery so that the inertia of the mower 100 may keep the mower 100 on its trajectory for a short distance before the mower 100 actually turns. Due to the two-dimensional information obtained from the boundary wire, such an unintended movement is detected and can be compensated. Should the mower 100 move closer to the boundary wire than intended, a smaller X component of the speed can be chosen to allow the mower to complete the turn within the specified area 102. Alternatively, the magnitude of the speed and thus the radius of the arc can be reduced by lowering the mean rotational speed or torque of the wheels while maintaining the rotational speed difference or torque difference between the wheels that causes the mower to turn.

The arc mode remains in place until the mower has adopted the desired yaw angle $\Psi_{des}$. If the mower comes into the vicinity of a different section of the boundary wire 103 at the specified turn distance d, it recalculates the desired yaw rate $\Psi_{des}$ relative to the most recently approached section of boundary wire 103.

FIG. 18 illustrates this principle with a birds-eye view of a simulated mowing pattern of lawn mower 100. An arbitrary starting position 156 was chosen for the lawn mower 100. The mower 100 starts off in a straight line until it reaches position 158 within the distance d from the boundary wire 103. Because the mower 100 approaches the boundary wire 103 and is within the distance d of the boundary wire 103, it enters the arc mode 154. According to the embodiment described in connection with FIG. 17, the sign of the actual yaw rate $\Psi_{act}$ is reversed for setting the desired yaw rate $\Psi_{des}$. Accordingly, the mower 100 performs a mirror reflection with respect to the boundary wire 103, where the incoming angle (defined by $\Psi_{act}$) is the same as the outgoing angle (defined by $\Psi_{des}$), only with reversed signs. Once the mower has completed the turn and reached the desired yaw angle $\Psi_{des}$, it reverts to the straight mode 152. Occasionally, the mower may be in the arc mode when it moves within the specified turn distance d of a different section of the boundary wire 103. Such a situation is shown in location 160. As the mower propagates in a straight line from the top of the graphic toward the location 160, it comes within the distance d from the lower horizontal portion of the boundary wire 103. Accordingly, the desired yaw angle $\Psi_{des}$ is calculated to lead the mower 100 along the path 162 indicated by a broken line. Before the arc is completed, however, the mower 100 arrives within the distance d of the left-side section of boundary wire 103. Accordingly, an new desired yaw angle is set corresponding to the reverse yaw angle of the mower in the location where it was located at the distance d from the left-side section of the boundary wire. Thus, the mower continues in the arc mode and describes a partial circle until it reaches the new desired yaw angle $\Psi_{des}$.

Further, where, due to wheel slip, the mower 100 has moved closer to the boundary wire than the distance d, the mower path, for example in location 164, describes an arc with a greater width parallel to the boundary wire 103 than arcs performed at the distance d, for example in location 166. For arc 164, the X component of the mower speed has been reduced to enable the mower to turn within the specified area 102. Because the Y component of the speed has not been reduced, the arc appears wider and shallower than in location 166. In general, the X component of the mower speed may be in a positive correlation with the distance D.

From the foregoing description of various preferred embodiments, it is apparent that various modifications can be made without departing from the scope of the invention as defined in the accompanying claims.

What is claimed is:

1. A vehicle control unit for a robotic mower, the vehicle control unit comprising a navigation arbitration logic configured to arbitrate a selection between at least a first propagation mode and a second propagation mode, the first propagation mode being a mode of straight propagation of the mower and the second propagation mode being a mode of arc-shaped propagation of the mower, the navigation arbitration module being configured to select the second propagation mode when receiving sensor information indicating that the mower approaches a boundary of a specified area and has a distance from the boundary that is equal to or smaller than a specified turn distance, the vehicle control unit being configured to receive sensor information representative of a measured yaw angle of the mower relative to the boundary.

2. The vehicle control unit of claim 1, wherein the vehicle control unit is configured to receive sensor information representative of a measured distance of the mower relative from the boundary and wherein the navigation arbitration logic is configured to generate output information representative of a desired speed vector in the second propagation mode, the desired speed vector being dependent on the measured distance.

3. The vehicle control unit of claim 2, wherein a speed component of the desired speed vector perpendicular to the boundary is positively correlated to the measured distance from the boundary.

4. The vehicle control unit of claim 2, wherein the magnitude of the desired speed vector is positively correlated to the measured distance from the boundary.

5. The vehicle control unit of claim 1, wherein the control unit is configured to generate input quantities for a mower propulsion system to cause a desired behavior based on the selection of the first propagation mode or the second propagation mode.

6. The vehicle control unit of claim 1, wherein the control unit is configured to generate input quantities for a mower blade motor system to cause a desired rotational blade speed based on the selection of the first propagation mode or the second propagation mode.

7. The vehicle control unit of claim 1, wherein the navigation arbitration logic is configured to generate output information representative of a desired speed vector, the desired speed vector having a greater magnitude in the first propagation mode than in the second propagation mode.

8. The vehicle control unit of claim 1, further comprising a positioning module configured to calculate an absolute current position of the mower within the specified area.

9. The vehicle control unit of claim 1, where the navigation arbitration module is configured to select the first propagation mode when the distance to the boundary is greater than the specified turn distance or the mower is moving away or parallel to the boundary wire.

10. A vehicle control unit for a robotic mower, the vehicle control unit comprising a navigation arbitration logic configured to arbitrate a selection between at least a first propagation mode and a second propagation mode, the first propagation mode being a mode of straight propagation of the mower and the second propagation mode being a mode of arc-shaped propagation of the mower, the navigation arbitration module being configured to select the second propagation mode when receiving sensor information indicating that the mower approaches a boundary of a specified area and has a distance from the boundary that is equal to or smaller than a specified turn distance, the vehicle control unit being configured to receive sensor information representative of a measured yaw angle of the mower relative to the boundary, and the navigation arbitration logic being further configured to generate output information representative of a desired yaw angle, the desired yaw angle being dependent on an assumed actual yaw angle being one of an estimated yaw angle and the measured yaw angle.

11. The vehicle control unit of claim 10, wherein in the first propagation mode the desired yaw angle relative to the boundary is equal to the measured yaw angle.

12. The vehicle control unit of claim 10, wherein in the second propagation mode the desired yaw angle represents a mirror reflection of the measured yaw angle on a vertical plane extending along the boundary.

13. The vehicle control unit of claim 10, further comprising an actuator module configured to convert the desired yaw angle into a yaw angle difference between the desired yaw angle and the assumed actual yaw angle.

14. A navigation system for a robotic mower, the navigation system comprising: a boundary wire defining a boundary of a specified area, a boundary sensor assembly, and a vehicle control unit including a navigation arbitration logic configured to arbitrate a selection between at least a first propagation mode and a second propagation mode, the first propagation mode being a mode of straight propagation of the mower and the second propagation mode being a mode of arc-shaped propagation of the mower, the navigation arbitration module being configured to select the second propagation mode when the sensor assembly indicates that the mower approaches the boundary of the specified area and has a distance from the boundary that is equal to or smaller than a specified turn distance, the boundary sensor assembly configured to generate a sensor signal representative of a measured yaw angle of the mower relative to the boundary wire.

15. The navigation system of claim 14, wherein the boundary sensor assembly generates a sensor signal representative of a measured distance of the mower relative from the boundary wire and wherein the navigation arbitration logic is configured to generate output information representative of a desired speed vector in the second propagation mode, the desired speed vector being dependent on the measured distance.

16. The navigation system of claim 15, wherein a speed component of the desired speed vector perpendicular to the boundary wire is positively correlated to the measured distance from the boundary wire.

17. The navigation system of claim 15, wherein the magnitude of the desired speed vector is positively correlated to the measured distance from the boundary wire.

18. The navigation system of claim 14, wherein the control unit is configured to generate input quantities for a mower blade motor system to cause a desired rotational blade speed based on the selection of the first propagation mode or the second propagation mode.

19. The navigation system of claim 14, wherein the navigation arbitration logic is configured to generate output information representative of a desired speed vector, the desired speed vector having a greater magnitude in the first propagation mode than in the second propagation mode.

20. The navigation system of claim 14, further comprising a positioning module configured to calculate an absolute current position of the mower within the specified area.

21. The navigation system of claim 14, where the navigation arbitration module is configured to select the first propagation mode when the distance to the boundary is greater than the specified turn distance or the mower is moving away or parallel to the boundary wire.

22. A navigation system for a robotic mower, the navigation system comprising: a boundary wire defining a boundary of a specified area, a boundary sensor assembly, and a vehicle control unit including a navigation arbitration logic configured to arbitrate a selection between at least a first propagation mode and a second propagation mode, the first propagation mode being a mode of straight propagation of the mower and the second propagation mode being a mode of arc-shaped propagation of the mower, the navigation arbitration module being configured to select the second propagation mode when the sensor assembly indicates that the mower approaches the boundary of the specified area and has a distance from the boundary that is equal to or smaller than a specified turn distance, the boundary sensor assembly configured to generate a sensor signal representative of a measured yaw angle of the mower relative to the boundary wire, the navigation arbitration logic being further configured to generate output information representative of a desired yaw angle, the desired yaw angle being dependent on an assumed actual yaw angle being one of an estimated yaw angle and the measured yaw angle.

23. The navigation system of claim 22, wherein in the first propagation mode the desired yaw angle relative to the boundary wire is equal to the measured yaw angle.

24. The navigation system of claim 22, wherein in the second propagation mode the desired yaw angle represents a mirror reflection of the measured yaw angle on a vertical plane extending along the boundary wire.

25. The navigation system of claim 22, further comprising an actuator module configured to convert the desired yaw angle into a yaw angle difference between the desired yaw angle and the assumed actual yaw angle.

26. The navigation system of claim 22, wherein the control unit is configured to generate input quantities for a mower propulsion system to cause a desired behavior based on the selection of the first propagation mode or the second propagation mode.

27. A method of navigating a robotic mower, the method comprising the steps of
receiving sensor information representative of a measured distance from a boundary of a specified area and a measured yaw angle relative to the boundary; and
arbitrating a selection between at least a first propagation mode and a second propagation mode, the first propagation mode being a mode of straight propagation of the mower and the second propagation mode being a mode of arc-shaped propagation of the mower;
wherein the second propagation mode is selected when receiving sensor information indicating that the mower approaches the boundary of the specified area and that the distance from the boundary is equal to or smaller than a specified turn distance.

28. The method of claim 27, further comprising the step of generating output information representative of a desired speed vector in the second propagation mode, the desired speed vector being dependent on the measured distance.

29. The method of claim 28, wherein a speed component of the desired speed vector perpendicular to the boundary is positively correlated to the measured distance from the boundary.

30. The method of claim 28, wherein the magnitude of the desired speed vector is positively correlated to the measured distance from the boundary.

31. The method of claim 27, further comprising the step of generating input quantities for a mower propulsion system to cause a desired behavior based on the selection of the first propagation mode or the second propagation mode.

32. The method of claim 27, further comprising the step of generating input quantities for a mower blade motor system to cause a desired rotational blade speed based on the selection of the first propagation mode or the second propagation mode.

33. The method of claim 27, further comprising the step of generating output information representative of a desired speed vector, the desired speed vector having a greater magnitude in the first propagation mode than in the second propagation mode.

34. The method of claim 27, further comprising the step of calculating an absolute current position of the mower within the specified area.

35. The method of claim 27, where the first propagation mode is selected when the distance to the boundary is greater than the specified turn distance or the mower is moving away or parallel to the boundary wire.

36. A method of navigating a robotic mower, the method comprising the steps of:
receiving sensor information representative of a measured distance from a boundary of a specified area and a measured yaw angle relative to the boundary;
arbitrating a selection between at least a first propagation mode and a second propagation mode, the first propagation mode being a mode of straight propagation of the mower and the second propagation mode being a mode of arc-shaped propagation of the mower, the second propagation mode being selected when receiving sensor information indicating that the mower approaches the boundary of the specified area and that the distance from the boundary is equal to or smaller than a specified turn distance; and
wherein the step of arbitrating a selection generates output information representative of a desired yaw angle, the desired yaw angle being dependent on an assumed actual yaw angle being one of an estimated yaw angle and the measured yaw angle.

37. The method of claim 36, wherein in the first propagation mode the desired yaw angle relative to the boundary wire is equal to the measured yaw angle.

38. The method of claim 36, wherein in the second propagation mode the desired yaw angle represents a mirror reflection of the measured yaw angle on a vertical plane extending along the boundary wire.

39. The method of claim 36, further comprising the step of converting the desired yaw angle into a yaw angle difference between the desired yaw angle and the assumed actual yaw angle.

* * * * *